(12) United States Patent
Mathews et al.

(10) Patent No.: US 6,560,689 B1
(45) Date of Patent: May 6, 2003

(54) TLB USING REGION ID PREVALIDATION

(75) Inventors: Gregory S. Mathews, Santa Clara, CA (US); Gary Hammond, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,442

(22) Filed: Mar. 31, 2000

(51) Int. Cl.[7] ............................................. G06F 12/14
(52) U.S. Cl. ...................... 711/204; 711/152; 711/108; 711/220
(58) Field of Search ................... 711/203, 220, 711/108, 204, 200, 207, 205, 152, 163

(56) References Cited

U.S. PATENT DOCUMENTS

| | | | | |
|---|---|---|---|---|
| 5,699,543 A | | 12/1997 | Saxena | ........................ 711/203 |
| 5,712,998 A | | 1/1998 | Rosen | ........................ 711/205 |
| 5,752,275 A | | 5/1998 | Hammond | ................... 711/207 |
| 5,918,251 A | * | 6/1999 | Yamada et al. | ............... 710/13 |
| 5,928,352 A | | 7/1999 | Gochman et al. | ........... 711/200 |
| 5,940,872 A | | 8/1999 | Hammond et al. | ......... 711/207 |
| 6,216,214 B1 | * | 4/2001 | Bryg et al. | .................. 711/203 |
| 6,230,248 B1 | * | 5/2001 | Burger et al. | ............... 711/156 |
| 6,408,373 B2 | * | 6/2002 | Burger et al. | ............... 711/207 |
| 6,470,437 B1 | * | 10/2002 | Lyon | .......................... 711/207 |

OTHER PUBLICATIONS

Handy, "The Cache Memory Book", © 1998, Academic Press, Inc., p. 14.*

* cited by examiner

*Primary Examiner*—Do Hyun Yoo
*Assistant Examiner*—B. R. Peugh
(74) *Attorney, Agent, or Firm*—Blakely, Sokoloff, Taylor & Zafman LLP (57) ABSTRACT

A prevalidation content addressable memory, CAM, is used to pre-decode a virtual address region extension and enable it for use by a translation look-aside buffer, TLB. The prevalidation CAM removes the region extensions stored in region registers from a serial TLB look-up path.

24 Claims, 10 Drawing Sheets

TLB USING REGION ID PREVALIDATION

BACKGROUND OF THE INVENTION

1. Field of the Invention

The present invention relates to the field of computer architecture and more specifically to a translation look-aside buffer for translating virtual addresses to physical addresses.

2. Description of the Related Art

In a computer, a typical practice is to use a translation look-aside buffer (TLB) to translate a virtual address to a physical address. The TLB generally operates to receive all or part of a virtual address and determines if an entry stored in the TLB matches the received virtual address. If there is a match, the TLB provides the physical address stored in the TLB which corresponds to the matched entry. This physical address from the TLB is typically combined with offset bits of the virtual address to generate a complete physical address. In TLB structures, the offset size is a function of the page size for the computer architecture being implemented.

The TLB essentially operates as a fast cache memory, which stores a subset of the total virtual to physical address translation mappings. When a virtual address matches one of the translations stored in the TLB, it is termed a TLB hit. When a TLB hit occurs, the physical address is quickly generated. If there is a miss, a delay is encountered in generating the physical address while the missing address translation is found, placed in the TLB, and a repetition of the original access is performed.

Processor architectures define the virtual addressing scheme to access the physical memory. Although various paging, segmentation, and other schemes can be employed, the addressing scheme is constrained by the number of bits available for processing the addresses. TLBs are designed within these constraints. TLBs using content addressable memory (CAM) can quickly match the virtual address to the entries stored in the TLB. However, as architectures expand from 32 to 64 bits, 128 bits and higher, the achitecture and the addressing scheme become more complex. The complexity often results in slower processor operation.

Accordingly, the present invention pertains to the operation of a TLB in a computer.

DETAILED DESCRIPTION OF THE INVENTION

Figure 1:
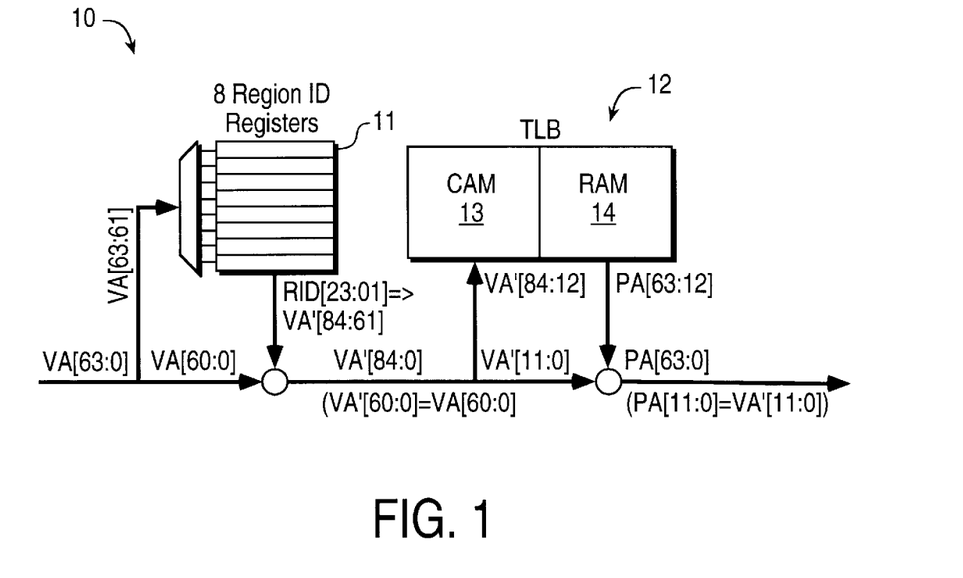
FIG. 1 is a schematic block diagram of an architectural model for translating a virtual address having a region extension to a physical address in a translation look-aside buffer.
Figure 2:
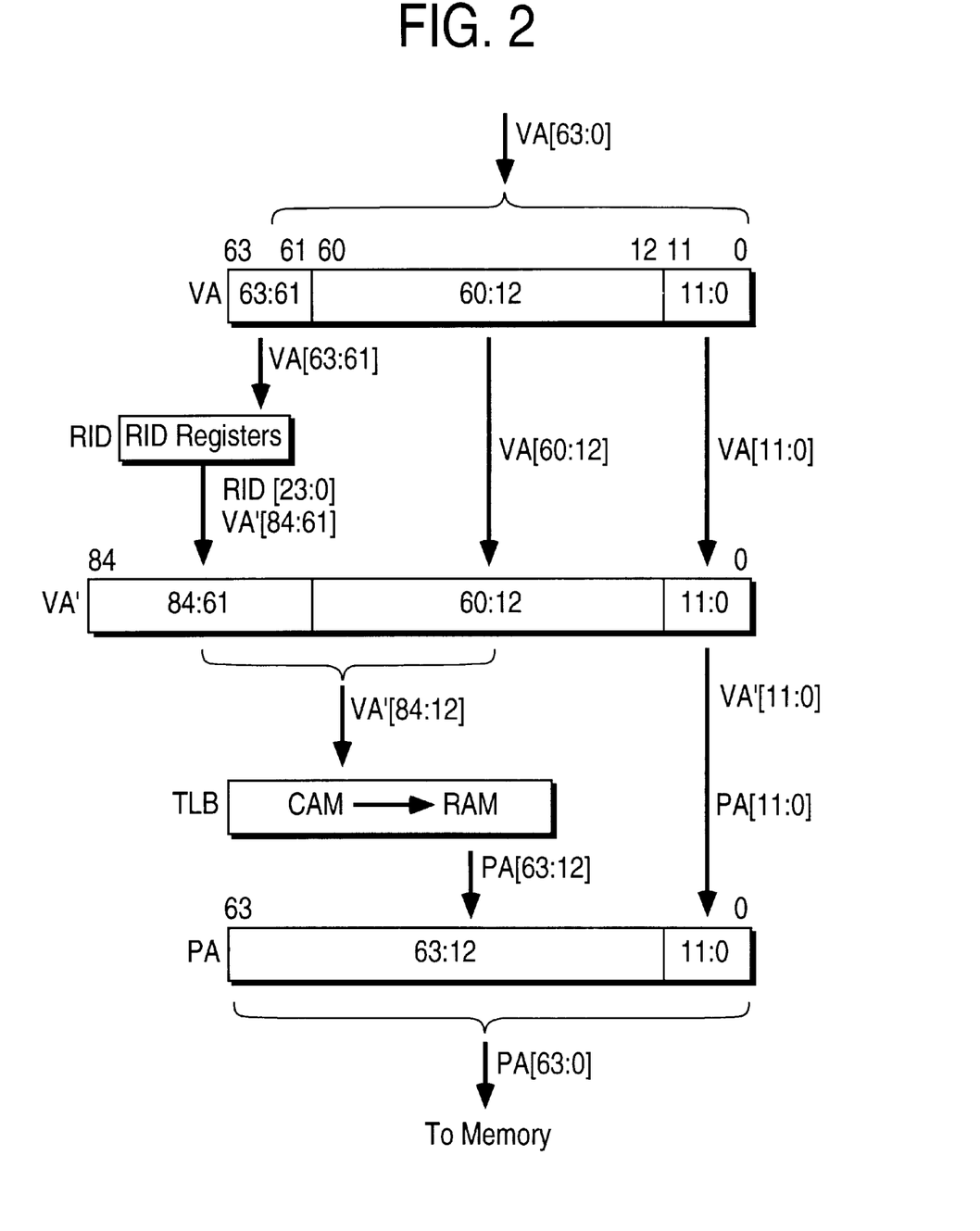
FIG. 2 illustrates the translation of the virtual address to a physical address for the schematic diagram of FIG. 1.

Referring to FIG. 1, an architectural address translation model 10 for a 64-bit addressing scheme is shown. FIG. 2 illustrates a bit flow diagram as the addresses transition through the components shown in FIG. 1. Accordingly a 64-bit virtual address, VA[63:0] (the [63:0] denotes bits 0 through 63), enters FIGS. 1 and 2 for translation to a physical address PA[63:0]. Typically, the virtual address VA is generated by a processor core. The model 10 is strictly for illustration of the architecture of a 64-bit addressing scheme for generating physical addresses. The invention operates in concordance with the architecture of the model 10 (with some noted exceptions) in generating physical addresses, but the invention implementation will appear different.

In the architectural address translation model 10, three of the bits VA[63 61] are used to select one of eight Region IDentification (RID) registers 11. A three to eight decoder is used for selecting the register identified by VA[63:61]. It is appreciated that less/more RID registers 11 can be used and selected by decoding of less/more bits. The RID registers 11 each contain a value that is designated as a region identifier or RID. Each RID is used to identify a region in memory. This is in addition to any paging, segmentation, etc. In practicing the invention, an operating system executed by a processor selects and utilizes the different regions for different programs or functions.

For example, when a process is to be switched (such as when context switching is performed in a processor), the processor selects a set of region identifiers to identify the different regions of memory associated with the second process which is to be switched in. Accordingly, during the context switch, the RID registers 11 are loaded with values of the region identifiers which correspond to the regions of memory associated with the new process. It is to be noted, that regions of memory can be exclusive, shared or overlapped, so that the same RID value may be present in two or more RID registers 11 and/or may be allocated to multiple processes. In the example of FIG. 1, each RID register 11 holds a 24-bit RID value, noted as RID[23:0]. The RID[23:0] value identifies the location of a particular region in memory associated with a process using that RID register 11. Thus, VA[63:61] selects one of the RID registers 11 whose output RID[23:0] is used for further translation of the virtual address signal.

In the operational model, the RID [23:0] bits are concatenated with the remaining VA[60:0] bits to form an 85-bit secondary virtual address VA'[84:0]. The RID[23:0] becomes VA'[84:61], and VA[60:0] is used for VA'[60:0]. Thus, the secondary virtual address VA'[84:0] is 85 bits in length and assuming a minimum page size of 4K, all but twelve of the bits are translated by a TLB 12.

Bits VA'[84:12] are coupled to a TLB content addressable memory (CAM) array 13 for translation. The TLB CAM 13 contains entries/logic such that when in operation, if the address input matches an entry in the CAM 13 (a TLB hit), a corresponding location in a TLB data array (shown in the Figures as a random-access-memory, RAM) 14 outputs a portion of a physical address noted as PA[63:12]. If a TLB miss occurs (the address input does not match an entry in the CAM 13), then the system invokes one of a variety of routines to obtain the missing translation (virtual address to physical address mapping) to be placed within the TLB (CAM and RAM arrays), places the translation into the TLB and the translation is performed again.

In the example model 10, the lower twelve bits of the virtual address VA'[11:0] represent offset within a 4K memory page. VA'[11:0] require no translation in the TLB 12 and form a portion PA[11:0] of the physical address. Once virtual to physical translation is completed, the 64-bit physical address, PA[63:0], is used to access a storage location, such as main memory of a computer. In the example, the page size implemented is 4 k ($2^{12}$), i.e. VA' [11:0] is used for addressing locations within the page. The offset/TLB data array/concatenation can be designed for other page sizes or designed to support variable page sizes as well.

The 64-bit virtual address VA[63:0] is converted to an 85-bit secondary virtual address by the utilization of the RID registers 11. Subsequently, 73 bits of this secondary virtual address are input to the TLB 14 for translation to generate a physical address. The RID bits are utilized to identify regions of memory specifically by processes which access a particular RID register. Again, typical practice is to assign different region identifiers for different processes, so that separate regions in memory can be configured to accommodate these different processes.

The architectural model 10 allows for regional identification of memory, but if the architecture is implemented structurally pursuant to the signal flow shown in FIG. 2, some disadvantages could result. The model 10 actually has two translations which are performed serially. First; VA[63:61] is used to select RID[23:0] for the first translation. Subsequently, RID[23:0] is then used for the second translation performed in the TLB 12. Thus, two serial translations are required.

Since the first translation is a register read, the output from the register can only occur after VA[63:61] has been decoded. The RID register 11 output is then sent to the TLB 12 for the TLB translation. The two serial translations may require more than one clock cycle to perform. Additionally, the TLB CAM 13 needs to process 73 bits of secondary virtual address, VA'[84:12]. The additional 24 bits of RID [23:0] increases the size of the CAM entry by about a third. The additional CAM size results in a slower response in the translation of the virtual address, as the CAM entry hit detection time scales with the number of entries and the number of address bits being compared.

Figure 3:
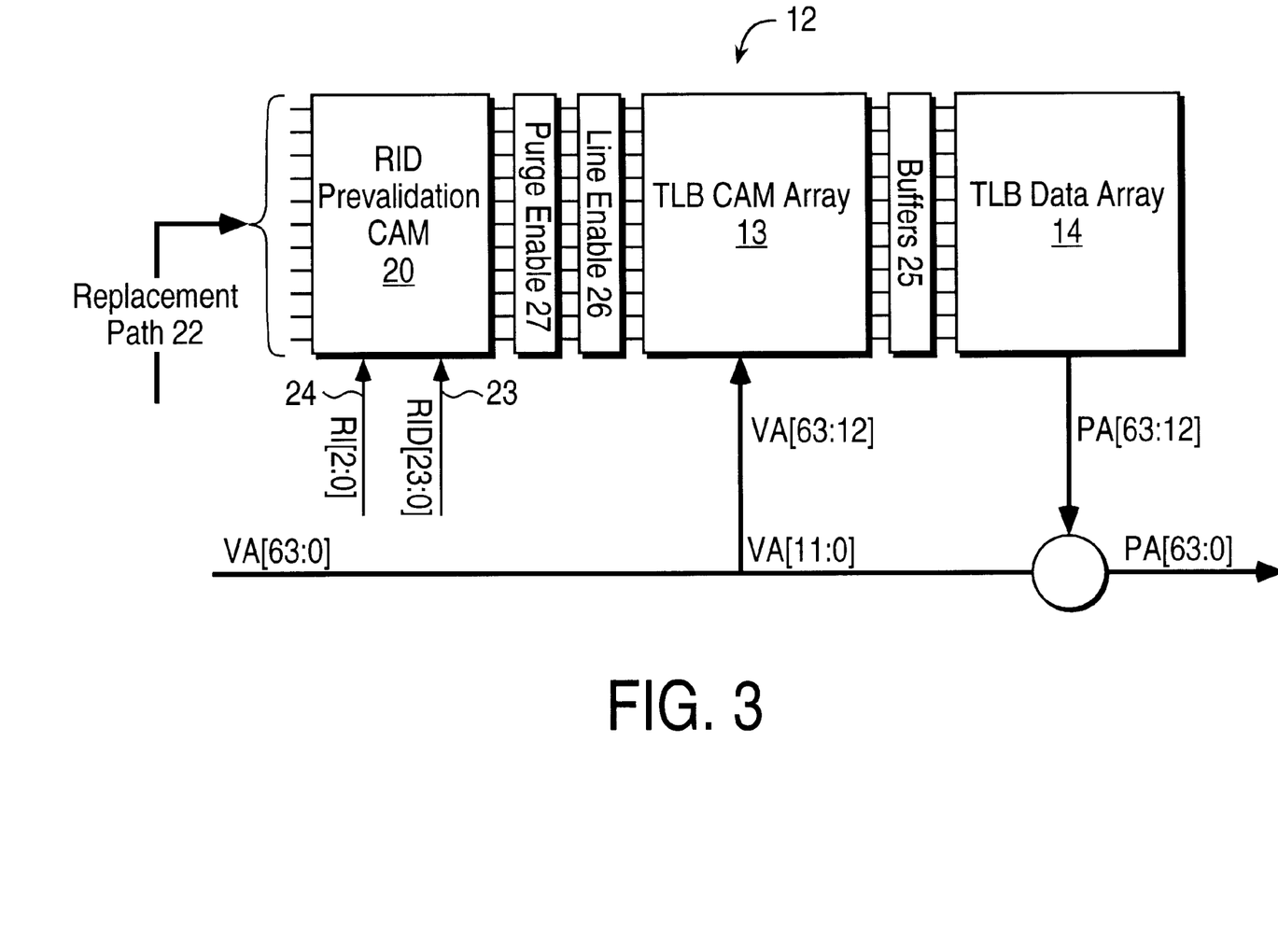
FIG. 3 is a schematic block diagram of the present invention in which a prevalidation CAM is used with the TLB to pre-decode the region extension portion of the virtual address.
Figure 4:
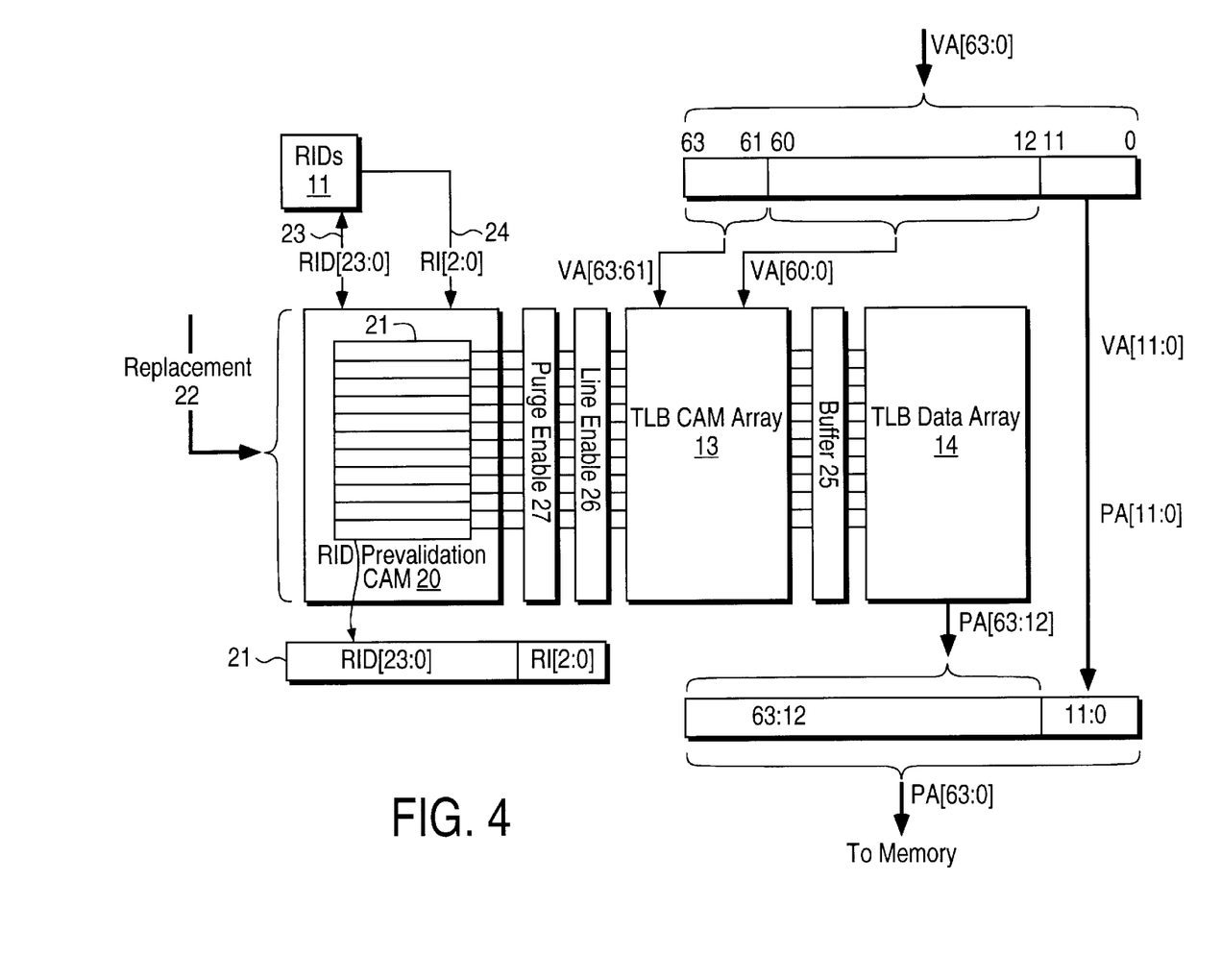
FIG. 4 illustrates the translation of the virtual address to a physical address for the schematic diagram of FIG. 3.

In order to provide an efficient implementation of the architectural model 10 of FIG. 1, the present invention utilizes a prevalidation CAM to remove the RID registers from the TLB look-up path and reduce the number of address bits compared in the TLB CAM during accesses. Accordingly, as shown in FIGS. 3 and 4, a prevalidation CAM 20 is utilized to pre-decode the RID portion of the secondary virtual address used by TLB CAM array 13.

The prevalidation CAM 20 of the preferred embodiment is an array having one entry 21 per TLB entry where any/multiple prevalidation CAM entries can contain representations for the contents of an RID register and a typical implementation would have many more TLB/prevalidation CAM entries than RID registers.

When a new entry is placed in the TLB, its corresponding prevalidation CAM entry is loaded as well via replacement path 22. The TLB CAM 13 is loaded with the virtual address, VA[63:12] (Note from FIG. 1 that VA[63:61] is used to select a RID register and thus generate the secondary virtual address bits VA'[84:61], where VA'[60:12]=VA [60:12]). The corresponding prevalidation CAM entry is loaded with the RID Register Index (number), RI[2:0] (which is the same as VA[63:61]), and VA'[84:61] (RID [23:0]) of the corresponding TLB entry, of the RID register which was identified by VA[63:61] of the new TLB entry upon insertion. Additionally, since the prevalidation CAM entry VA'[84:61] (RID[23:0]) of the corresponding TLB entry matches RID[23:0] of the RID register identified by the prevalidation CAM entry RI[2:0], Line Enable 26 of the TLB entry which corresponds to the prevalidation CAM entry will be set (enabled).

The RID[23:0] and RI[2:0] values are stored in the prevalidation CAM 20 array, are used to provide a predecode of the VA'[84:61] portion of the address that would architecturally be sent to the TLB CAM 13 (as shown in FIG. 1). Thus, when a virtual address VA[63:0] is received for translation, a secondary virtual address VA' does not need to be generated/compared. More specifically, if the Line Enable 26 of a TLB entry is set, it indicates that the architectural secondary virtual address VA'[84:61] will match that of the TLB entry (stored as RID[23:0] in the corresponding prevalidation CAM entry), if VA[63:61] points to the RID register identified by RI[2:0] (in the corresponding prevalidation CAM entry) and the content of that RID register has not changed since the TLB entry was inserted. Since RI[2:0] is the same as VA[63:61] upon TLB entry insertion, it is implied that so long as the RID register content has not changed, a TLB entry with its Line Enable set, whose stored VA[63:61] matches the incoming VA[63:61], VA'[84:61] of the incoming access would have matched VA'[84:61] of the TLB entry if the RID registers had been read (using VA[63:61]). Therefore, instead of sending VA'[84:12] to the TLB, VA[63:12] can be directly sent to the TLB (as shown in FIGS. 3 and 4), where VA[60:12]=VA'[60:12], and a match of VA[63:61] with the Line Enable set actually implies a match of VA'[84:61].

The offset bits VA[11:0] are used in the same manner as previously described. That is, VA[11:0] bypasses the TLB 12 to generate PA[11:0] to address each 4 k page selected. Again, as previously described, the number of these offset bits need not be constrained to twelve bits as shown in the example illustrations of FIGS. 1–4.

It is to be noted that several other units are shown in FIGS. 3 and 4. For example, buffers 25 are used between the TLB CAM array 13 and the TLB data array 14 for buffering the match signal from the TLB CAM 13 and a purge enable (PE) circuit 27 is placed between the prevalidation CAM 20 and the TLB CAM 12.

As previously described, the use of Line Enable 26, with VA[63:61] allows the TLB to perform virtual address match calculations without first reading the RID registers and generating VA'[84:61]. However, it also follows, that if the content of the RID register identified by a prevalidation CAM array entry RI[2:0], does not match its RID[23:0] (which represents VA'[86:61] of the corresponding TLB entry), then it should not be possible to match the TLB entry. This case can be generated by changing the contents of a RID register (after TLB/prevalidation CAM array entries have been loaded based upon its previous value). It is enforced by clearing of the Line Enables of affected TLB/ prevalidation CAM array entries (if a TLB entry Line Enable 26 is not set, then the entry cannot be matched) as described below.

Figure 5:
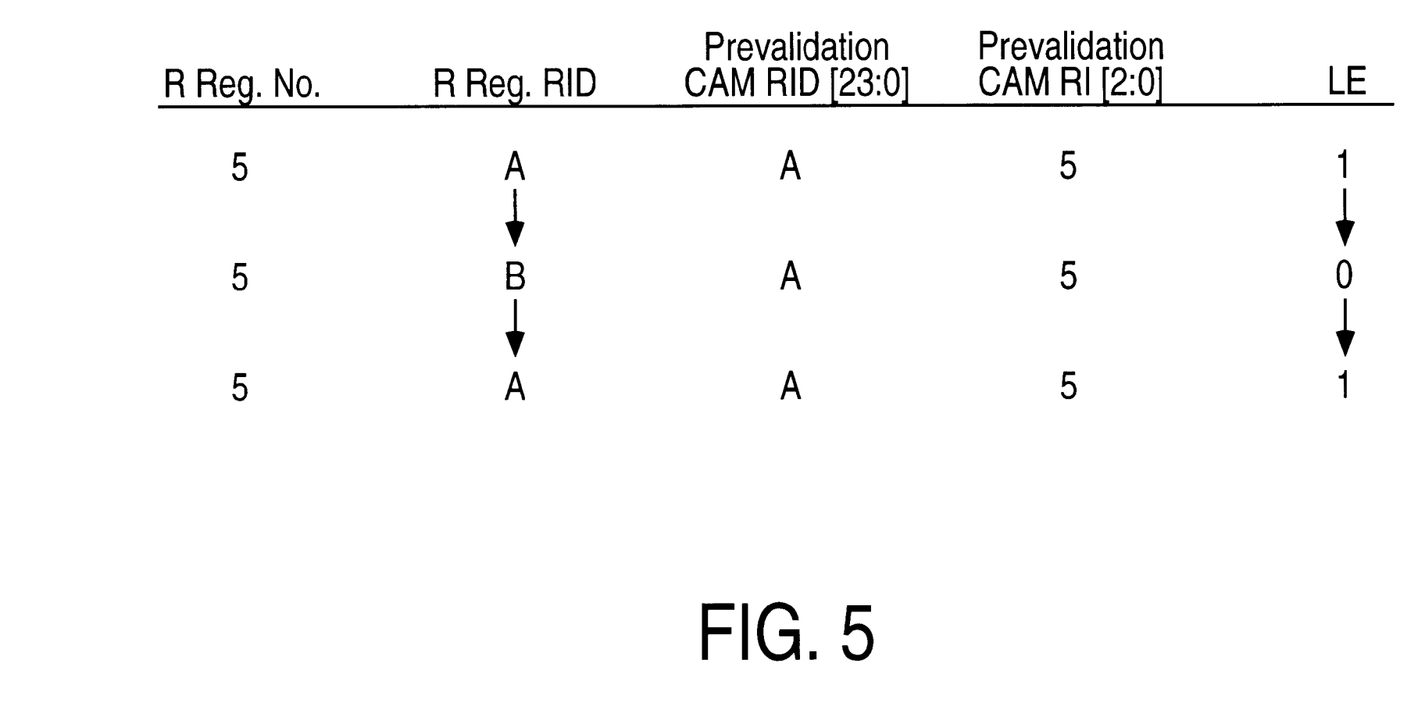
FIG. 5 illustrates the use of a line enable bit for enabling a valid selected entry in the prevalidation CAM.

In FIG. 5, an example is shown using arbitrary values for the RI and RID values. On the first line, RID register number five is shown with an initial RID value (RID register RID[23:0]) of "A". A prevalidation CAM entry 20 corresponding to a TLB entry for which VA[63:61]=5, was loaded based upon this RID register value, and therefore contains a prevalidation CAM RID [23:0]="A" and an RI[2:0]=5. The Line Enable bit 26 of this entry is set to "1" because the same RID [23:0] values are loaded into RID register number five and the prevalidation CAM 20 which points to a RID register number five (RI[2:0]=5).

The second line in FIG. 5 exemplifies a situation where the Operating System (OS) changes the content of RID register number five, as in a context switch, to "B" (RID register RID[23:0]="B"). However, the prevalidation CAM entry RID[23:0], still contains the old value "A" (i.e. if a program tried to access a region via VA[63:61]=5, it would get "B" for VA'[84:61], not "A"). Therefore, all prevalidation CAM entries (and their corresponding TLB entries) which point to RID register number five (via their RI[2:0] and their corresponding TLB CAM entry's VA[63:61] bits), but do not contain RID[23:0]="B" must be disabled. This is done by clearing their Line Enable 26 bits to "0", as shown in FIG. 5.

On the last line in FIG. 5, the OS changes the content of RID register number five back to "A" (RID register RID [23:0]="A") and the prevalidation CAM entry RID[23:0], still contains the old value "A" (i.e. if a program tried to access a region via VA[63:61]=5, it would again get "A" for VA'[86:61]). Therefore, all prevalidation CAM entries (and their corresponding TLB entries) which point to RID register number five (via their RI[2:0] and their corresponding TLB CAM entry's VA[63:61] bits), which contain RID [23:0]="A" should be re-enabled. This is done by setting their Line Enable 26 bits to "1", as shown in FIG. 5. It is to be noted that the previously described process for setting/clearing of the Line Enable bits 26 and use of the Line Enable bits as a substitute for the architectural process of generating VA'[84:61] and comparing VA'[86:61] with TLB CAM contents to determine entry matches differs from the strict architectural model 10. In the case that two RID registers, for example RID registers 3 and 5, contain the same RID[23:0] value, for example "X", a TLB entry which matched VA'[84:61]="X" would match if VA[63:61] was 3 or 5, a TLB entry created according to the invention implementation could only match one or the other (two entries would be required to match both).

Figure 6:
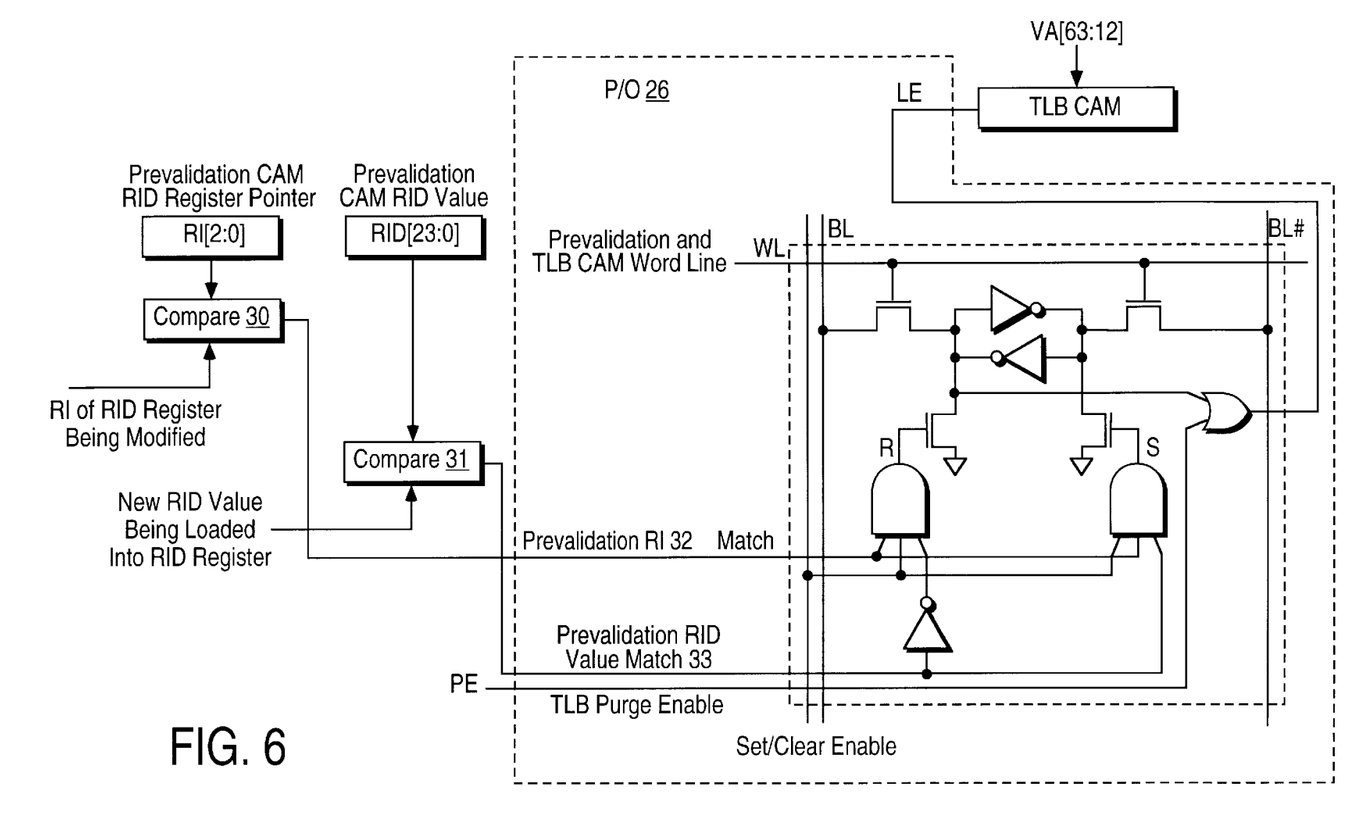
FIG. 6 is a schematic block diagram of a line enable circuit of the preferred embodiment for generating the line enable bit.

FIG. 6 shows an example of the logic used to set and clear the Line Enable 26 bits. Each prevalidation CAM entry would contain such logic. The Line Enable 26 bit cell shown in FIG. 6 may be read and written explicitly via the complementary bit lines BL and BL# using the Prevalidation and TLB CAM word line (used to set the Line Enable when new TLB entries are inserted). Alternatively, the Line Enable (LE) bit will be set to "1", if the Set/Clear enable is active ("1"), the Prevalidation RI match 32 is active ("1"), and the Prevalidation RID Value Match 33 is active ("1"). The Line Enable bit will be cleared or reset to "0", if the Set/Clear enable is active ("1"), and the Prevalidation RI match 32 is active ("1"), and the Prevalidation RID Value Match 33 is inactive ("0"). Otherwise, the Line Enable bit 26 will retain its previous state. For purposes of TLB purging, the Line Enable 26 can be temporarily asserted without changing its permanent state when the TLB Purge Enable is asserted ("1").

As previously explained in the description of FIG. 5, when a RID register is written with a new RID value (RID[23:0]), those Prevalidation CAM array entries which point to the RID register being written (according to their RI[2:0] bits), that have the same RID value as the new value of the RID register, must have their corresponding Line Enables set, and those Prevalidation CAM array entries which point to the RID register being written (according to their RI[2:0] bits), that do not have the same RID value as the new value of the RID register, must have their corresponding Line Enables cleared. To accomplish this using the structures shown in FIG. 6, when a RID register is written, the RID register number is compared with the RI[2:0] bits of each Prevalidation CAM array entry via comparator 30 to generate the Prevalidation RI Match 32 signal. Additionally, the new RID register value is compared with the RID[23:0] bits of each Prevalidation CAM array entry via comparator 31 to generate the Prevalidation RID Value Match 33 signal. Simultaneously, the Set/Clear Enable signal is temporarily asserted to "1" to allow the results of the match signals 32 and 33 to update the Line Enables.

In the described embodiment, it is to be noted that the RID value match alone will not generate a line enable of "1". There must also be an index match as well. It is also to be noted that line enable clearing is not a purging function, since the prevalidation CAM entries 21 are not affected by the Line Enable cleaning operation. The LE bit is one of the control signals which gates the generation of a TLB hit. By using the LE bit, the TLB/prevalidation CAM entry can be re-enabled if the RID register it points to is reloaded with the original RID value. Furthermore, it is to be noted that the LE bit is in addition to any other valid bit(s) used for gating whether or not a TLB entry can be matched.

TLB purges (the removal/invalidation of TLB entries described by ranges of virtual addresses) are performed with the aid of the Purge Enable circuit 27. An architectural purge, according to architectural model 10 would input a VA'[84:12] and a range (for example 4M bytes), and all TLB entries whose CAM entry virtual address fell within a 4M bytes range starting at VA'[84:12] (aligned to the nearest, lower, 4M byte boundary) would be invalidated/eliminated. Architectural purges are generally purges initiated according to software and thus have expected/guaranteed results. Hardware purges are initiated by hardware for the purpose of TLB clean up and thus may have inconsistent results from implementation to implementation. For example, in the event a TLB miss occurs and a hardware engine is used to find/insert the missing translation, it would be desirable to purge the TLB of any entries which overlapped the new entry before the new entry was inserted (to avoid any possibility of electrical contention). This type of purge is not designed to eliminate a TLB translation, but is only designed to clean up the TLB. Thus, for the example, TLB translations which overlap the new translation from an architectural perspective, like model 10, would be optionally purged, and TLB translations which overlapped the new translation from an implementation perspective would be required to be purged.

Figure 7:
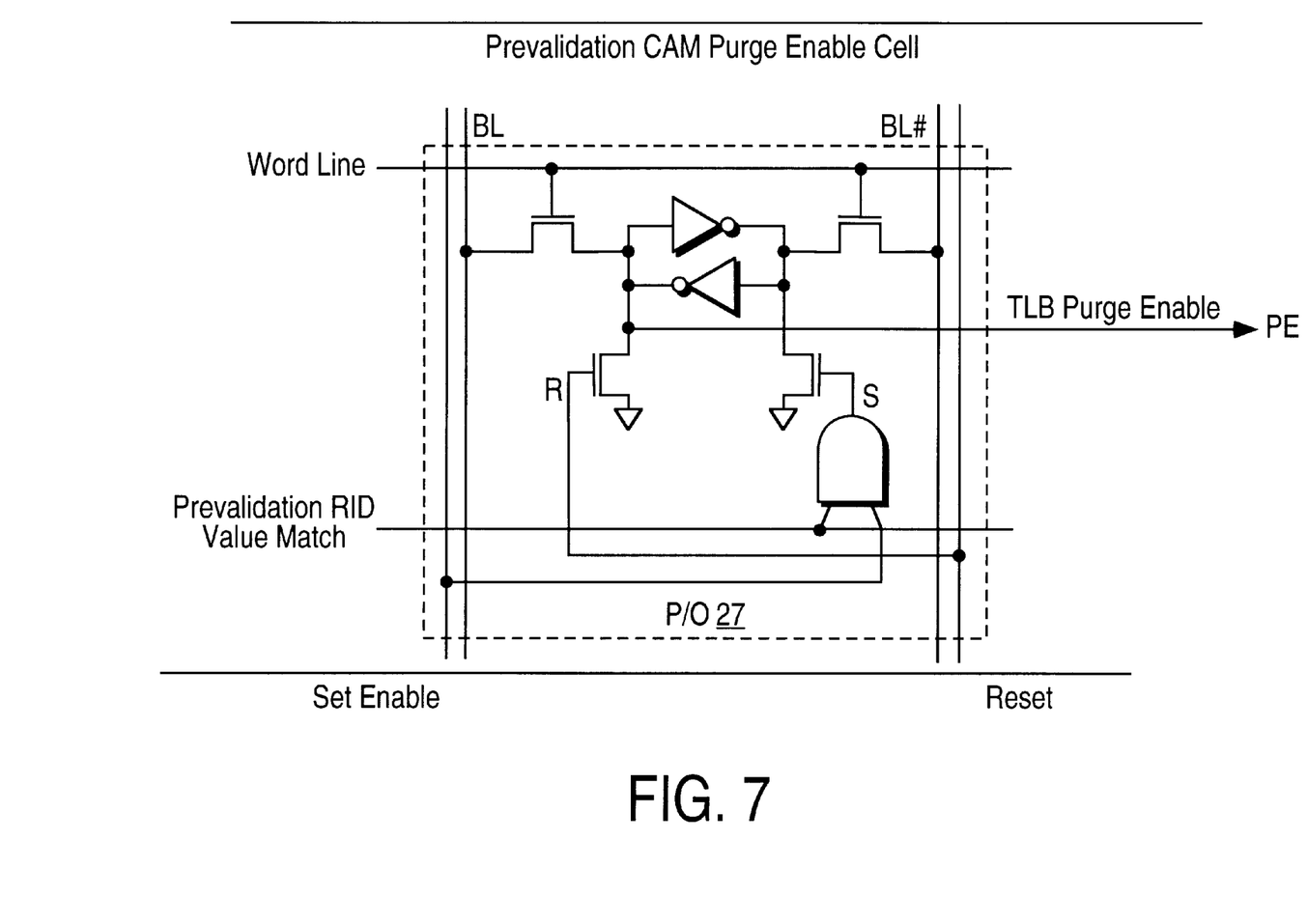
FIG. 7 is a schematic block diagram of a purge enable circuit of the preferred embodiment for generating a purge enable bit for use in purging the TLB.

One example of a Purge Enable (PE) circuit 27 is shown in FIG. 7. The purge enable is used to facilitate architectural purges. An architectural purge, as previously described, as intended to invalidate/eliminate all TLB entries whose CAM entries fall within a given secondary virtual address range. The purged range is expected to function independently of the RID register used to obtain the purging secondary address range, and in fact, could be supplied from an external source such that the TLB purging VA'[84:61] input does not correspond to any of the local processor's current RID register values. For the invention to perform an architectural purge, the input VA'[84:61] is compared against all prevalidation CAM entries RID[23:0] values to generate Prevalidation RID Value Match 33 signals. At the same time, the Set Enable of the Prevalidation CAM Purge Enable Cell in FIG. 7 is temporarily asserted to "1" allowing the Purge Enable bits of the TLB entries whose prevalidation RID Value Match 33 signals are asserted to be set to "1". The setting of the Purge Enables will cause the Line Enables to be asserted (as shown in FIG. 6) for those TLB entries whose prevalidation CAM entries contain RID values (RID[23:0] which maps to VA'[84:61] of the TLB entry) that match the VA;[84:61] input. The remainder of the supplied purge address, VA'[60:12] is then compared against the TLB CAM entries. TLB entries whose CAM contents match the VA' [60:12] supplied, and whose Line Enable bits are set are invalidated. Note, because architectural purges are independent of the RID register used to generate VA'[84:12], the prevalidation CAM array RI bits and the TLB CAM VA[63:61] bits are not a part of the purging function. During architectural purges, comparisons against the TLB CAM entry's VA[63:61] bits are don't cared/forced to match. The use of the Purge Enable to force Line Enables active (Purge Enable generation is based solely upon RID Value Matching) eliminates the RI bits from affecting the purging process. Once the TLB entry invalidations have been completed, the Reset of the Prevalidation CAM Purge Enable Cell in FIG. 7 is temporarily asserted to "1", thus clearing the Purge Enable bits of the TLB entries to "0".

It is to be noted that the PE signal applies to the RID value only. The TLB 12 will also CAM appropriate bits of the VA[60:12] for a match to complete the address matching of the purge. Some or all of the bits of the VA[60:12] may be don't cared where the purge being effected is for a larger size page. For example, to purge a 64K page, bits VA[15:12] are don't cared/forced to match.

Hardware purges, as previously described, are used to clean up a TLB. For example, a hardware purge used to remove TLB existing which overlap a new entry to be inserted (as a result of a hardware engine search for a missing translation) before the insertion takes place in order to avoid any possibility of electrical contention. Since this purge is only intended to eliminate electrical contention (multiple TLB matches for a single input address), it is only necessary to compare the VA[63:12] and page size/range of the new translation against the TLB CAM array. If the TLB entry Line Enable is set, and the TLB CAM array matches the address/page size input, then the entry will be invalidated. It is not necessary to invalidate any TLB entries whose Line Enables are not set as they cannot be matched (and therefore cannot cause contention with the new entry).

Figure 8:
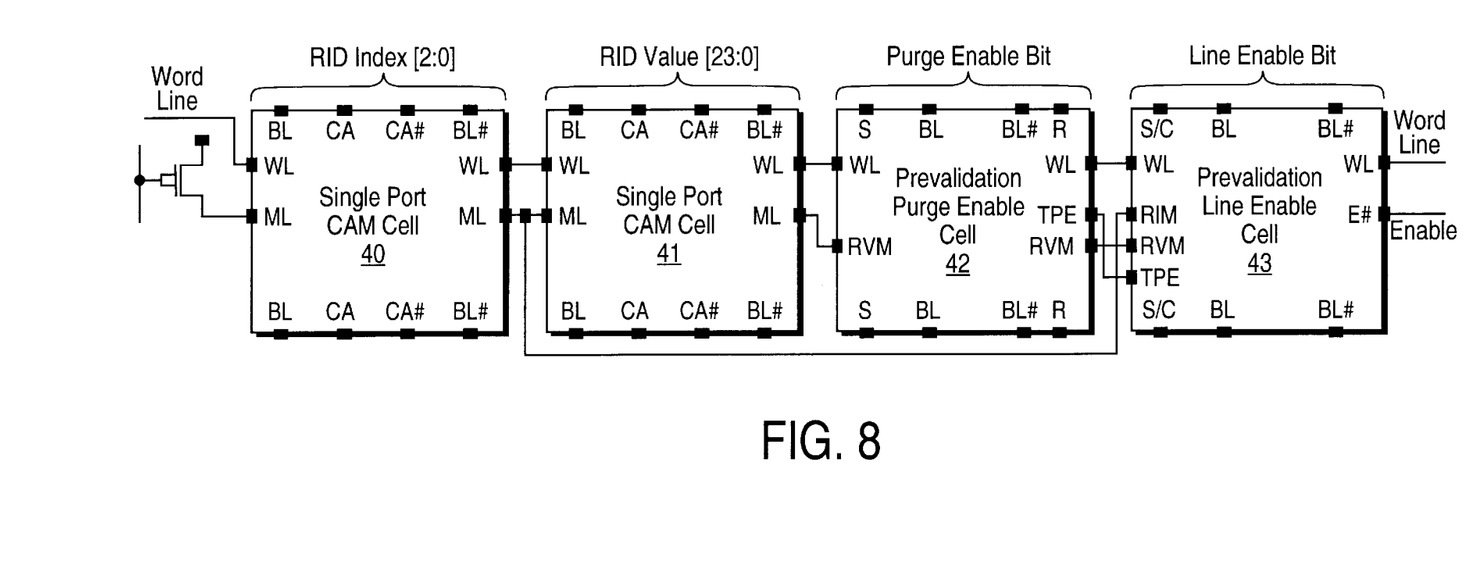
FIG. 8 is a schematic block diagram illustrating an arrangement of array cells which comprise the prevalidation circuit of the present invention.

It is to be further noted that the present invention can be implemented in a variety of ways to practice the invention. One embodiment is shown in FIG. 8, wherein the prevalidation CAM 20 is structured as multiple arrays, having the wordlines (WL) coupled together. A RID index (RI) CAM array 40 cams the RI[2:0] against the stored index pointer and a RID CAM 41 cams the RID[23:0] against the stored RID value. A purge cell array 42 and line enable cell array 43 are employed for generating the purge enable and line enable signals, respectively. The four array units 40–43 form the prevalidation array 20, which is then placed physically proximal to the TLB 12.

Figure 9:
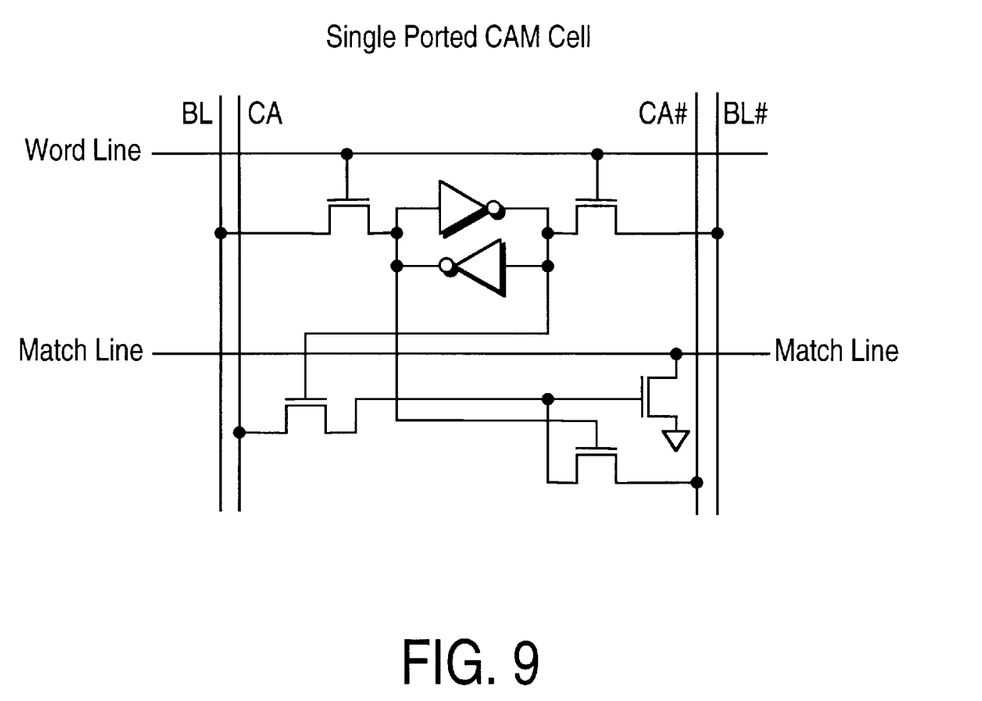
FIG. 9 is a schematic block diagram of a single-ported CAM cell used in the prevalidation CAM.

FIG. 9 shows an exemplary circuit of a single-ported CAM cell for the prevalidation CAM 20. The cell is written via the complementary bit lines BL and BL# when the Word Line is active ("1"). The cell performs comparisons using the complementary CAM input lines CA and CA#. While the CA and CA# lines are both "1", the Match line is precharged to a "1". Then, the value to be compared is placed on the complementary CAM input lines (if the value is "1", CA is "1" and CA# is "0", if the value is "0", CA is "0" and CA# is "1", if the value is to be a don't care, CA is "1" and CA# is "1"). If the CAM input value matches that of the CAM cell contents or is a "don't care", then the Match line will remain active ("1"), else it will be discharged to "0" indicating a mismatch. Multiple cells can share a single match line in order to provide comparisons of larger pieces of data. As shown, the CAM cell is single-ported. It can be made multi-ported, but for the specific embodiment, it was only possible to write on RID register per clock. Therefore, only one port was needed to update the prevalidation CAM 20 array. In contrast, the embodiment had a multi-ported TLB. When performing a TLB look-up, multiple virtual addresses, VA[63:12], would be presented to the TLB to generate physical addresses. This yielded another advantage to this invention in that, for those virtual address bits (VA[84:61] in this case) which are moved to the prevalidation CAM 20 instead of being placed in the TLB CAM, only a single-ported CAM cell is needed (assuming only 1 RID register update per clock) even if the TLB is multi-ported (which saves array area). However, the porting techniques are a design choice and various configurations can be adapted to practice the invention.

Figure 10:
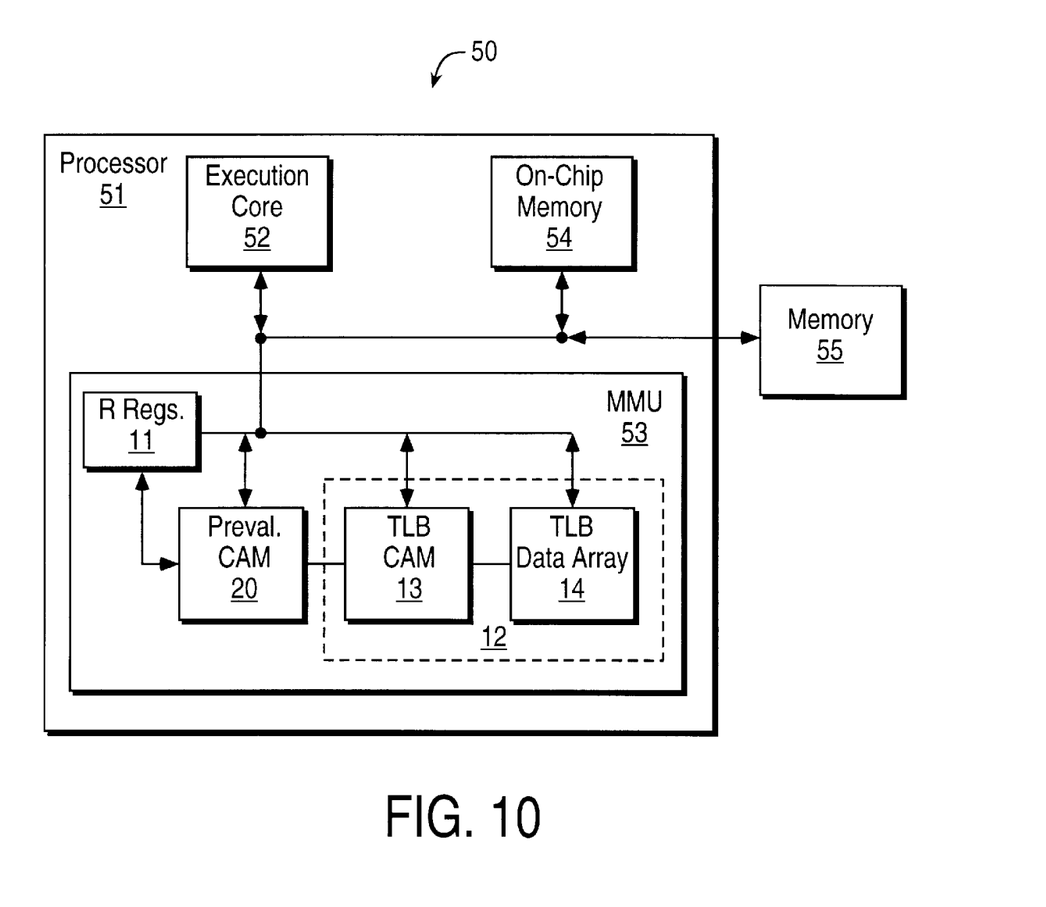
FIG. 10 is a schematic block diagram exemplifying a computer system in which the present invention is implemented to translate a virtual address to a physical address.

FIG. 10 illustrates one typical system implementation for the invention. A computer 50 is shown in which a processor 51 functions as a sole or one of a plurality of processors comprising the central processing unit (CPU) or units of the computer 50. Typically, the processor 51 is embodied in a single integrated circuit chip. The processor 51 includes an execution (processing) core 52, which has one or more execution units. A section of the processor is dedicated to memory management and is typically referred to as a memory management unit (MMU), among other names. A MMU 53 is shown coupled to the core 52. In this embodiment, the region registers 11, prevalidation CAM 20, TLB components 13 and 14 are shown as part of the MMU 53. It is appreciated that the registers 11 could be located elsewhere in the processor 51. Generally, the prevalidation CAM 20 and the TLB 12 are located together and generally in the MMU.

The invention is practiced according to the description above to receive a virtual address from the core 52 and generate a physical address for accessing a memory location. The memory can be located on-chip (as shown by on-chip memory 54) or off-chip (as shown by off-chip memory 55). Typically, the on chip memory can be a cache memory or part of the main memory (RAM). The off-chip memory is typically comprised of main memory (but may include a cache), which also is coupled to other memory devices, such as to a disk storage medium. However, it is to be noted, that the invention can be configured in other ways to perform the address translation described above.

Thus, a prevalidation CAM for use with a TLB to translate virtual address to a physical address is described. The pre-decoding of the RID portion of the TLB translation removes the register-based virtual address extension from the TLB lookup timing path, therein reducing the time required for the virtual address translation. Enable bits are used to indicate lines which are mapped to RID values currently in the RID register file. The TLB CAM array will use the pre-validated line enable bits as a substitute for the look-up of the regional portion of the virtual address when performing TLB look-ups.

The invention allows for the architectural virtual address extension without causing impact to the TLB look-up. It also reduces the area consumed by multi-ported TLBs to support these extensions. That is, if the address extension is made part of the TLB CAM, the extension portion would be required for each port of a multi-ported TLB. Additionally, the prevalidation CAM is positioned on the side of the TLB to keep the prevalidation CAM 20 out of the path between the TLB CAM 13 and the RAM array 14. Furthermore, the invention allows for two types of purging to be performed.

We claim:

1. An apparatus comprising:
    a storage unit to store a plurality of region identification values associated with addressing corresponding regions in memory and a plurality of index values corresponding to registers used to hold region addresses to access the regions in memory;
    a translation buffer to receive a virtual address and to generate a physical address, if the virtual address matches a corresponding tag address stored in said translation buffer; and
    an enable logic circuit to generate a line enable signal to enable an entry in said translation buffer for the corresponding tag address, if a region address in a selected register matches one of the region identification values and an index coded in the virtual address indexing the register holding the matching region address matches the index value for the corresponding region identification value, the line enable signal to allow access to one of the regions in memory without reading from the register to generate a second virtual address.

2. The apparatus of claim 1, wherein said storage unit comprises a content addressable memory to store the region identification values and the index values.

3. The apparatus of claim 1, wherein said storage unit uses the region addresses to map to a region of the memory that is allocated for a particular process.

4. The apparatus of claim 1 further comprising a purge enable unit to purge a corresponding region of memory, if a region address in a selected register matches one of the region identification values.

5. The apparatus of claim 1 further comprising a purge enable circuit to purge a region of memory, if a region address in a selected register matches one of the region identification values and an index coded in the virtual address indexing the register holding the matching region address matches the index value for the corresponding region identification value.

6. An address translation apparatus comprising:
    a prevalidation unit to store a plurality of region identification values associated with addressing corresponding regions in memory and a plurality of index values corresponding to registers used to hold region addresses to access the regions in memory;
    a translation look-aside buffer to receive a virtual address and to generate a physical address, if the virtual address matches a corresponding tag address stored in said translation look-aside buffer; and
    an enable logic circuit to generate a line enable signal to enable an entry in said translation look-aside buffer for the corresponding tag address, if a region address in a selected register matches one of the region identification values and an index coded in the virtual address indexing the register holding the matching region address matches the index value for the corresponding region identification value, the line enable signal to allow prevalidation of region addresses to access regions in memory and enable corresponding entries in said translation look-aside buffer.

7. The address translation apparatus of claim 6, wherein said prevalidation unit comprises a content addressable memory to store the region identification values and the index values.

8. The address translation apparatus of claim 6, wherein said prevalidation unit uses the region addresses to map to a region of the memory that is allocated for a particular process.

9. The address translation apparatus of claim 6 further comprising a purge enable unit to purge a corresponding region of memory, if a region address in a selected register matches one of the region identification values.

10. The address translation apparatus of claim 6 further comprising a purge enable circuit to purge a region of memory, if a region address in a selected register matches one of the region identification values and an index coded in the virtual address indexing the register holding the matching region address matches the index value for the corresponding region identification value.

11. A processor comprising:
    a processing core to generate a virtual address to access a given region in memory;
    a plurality of region identification registers to store region addresses;
    a prevalidation unit to store a plurality of region identification values associated with addressing corresponding regions in memory and a plurality of index values corresponding to region identification registers used to hold region addresses to access the regions in memory;
    a translation look-aside buffer to receive the virtual address and to generate a physical address, if the virtual address matches a corresponding tag address stored in said translation look-aside buffer; and
    an enable logic circuit to generate a line enable signal to enable an entry in said translation look-aside buffer for the corresponding tag address, if a region address in a selected region identification register matches one of the region identification values and an index coded in the virtual address indexing the region identification register holding the matching region address matches the index value for the corresponding region identification value, the line enable signal to allow prevalidation of region addresses to access regions in memory and enable corresponding entries in said translation look-aside buffer.

12. The processor of claim 11, wherein said prevalidation unit comprises a content addressable memory to store the region identification values and the index values.

13. The processor of claim 12, wherein said prevalidation unit uses the region addresses to map to a region of the memory that is allocated for a particular process.

14. The processor of claim 12 further comprising a purge enable unit to purge a corresponding region of memory, if a region address in a selected register matches one of the region identification values.

15. The processor of claim 12 further comprising a purge enable circuit to purge a region of memory, if a region address in a selected register matches one of the region identification values and an index coded in the virtual address indexing the register holding the matching region address matches the index value for the corresponding region identification value.

16. A computer system comprising:
    a memory;
    a processor to generate a virtual address to access a given region in memory;

a plurality of region identification registers to store region addresses;

a prevalidation unit to store a plurality of region identification values associated with addressing corresponding regions in memory and a plurality of index values corresponding to region identification registers used to hold region addresses to access the regions in memory;

a translation look-aside buffer to receive the virtual address and to generate a physical address, if the virtual address matches a corresponding tag address stored in said translation look-aside buffer; and an enable logic circuit to generate a line enable signal to enable an entry in said translation look-aside buffer for the corresponding tag address, if a region address in a selected region identification register matches one of the region identification values and an index coded in the virtual address indexing the region identification register holding the matching region address matches the index value for the corresponding region identification value, the line enable signal to allow prevalidation of region addresses to access regions in memory and enable corresponding entries in said translation look-aside buffer.

17. The computer system of claim 16, wherein said prevalidation unit comprises a content addressable memory to store the region identification values and the index values.

18. The computer system of claim 17, wherein said prevalidation unit uses the region addresses to map to a region of the memory that is allocated for a particular process.

19. The computer system of claim 17 further comprising a purge enable unit to purge a corresponding region of memory, if a region address in a selected register matches one of the region identification values.

20. The computer system of claim 17 further comprising a purge enable circuit to purge a region of memory, if a region address in a selected register matches one of the region identification values and an index coded in the virtual address indexing the register holding the matching region address matches the index value for the corresponding region identification value.

21. A method comprising:

storing a plurality of region identification values associated with addressing corresponding regions in memory and a plurality of index values corresponding to region identification registers in a prevalidation unit to a translation look-aside buffer;

generating an enable signal to enable an entry in the translation look-aside buffer for a corresponding tag address of a virtual address, if a region address in a selected region identification register matches one of the region identification values and an index coded in the virtual address indexing one of the region identification registers holding the matching region address matches the index value for the corresponding region identification value, the enable signal to allow prevalidation of region addresses to access regions in memory and enable corresponding entries in the translation look-aside buffer.

22. The method of claim 21 further comprises changing the region address in one of the region identification registers which causes a respective entry for the tag in the translation look-aside buffer to be disabled by the enable signal, but returning the original region address in the one region identification register causes the respective entry for the tag in the translation look-aside buffer to be enabled.

23. The method of claim 21 further comprises purging a corresponding region of memory, if a region address in a selected region identification register matches one of the region identification values.

24. The method of claim 21 further comprises purging a corresponding region of memory, if a region address in a selected region identification register matches one of the region identification values and an index coded in the virtual address indexing the region identification register holding the matching region address matches the index value for the corresponding region identification value.

* * * * *